US010882232B2

(12) United States Patent
Shaw et al.

(10) Patent No.: US 10,882,232 B2
(45) Date of Patent: *Jan. 5, 2021

(54) VARIEGATED BUILDING PRODUCT AND METHOD

(71) Applicant: CERTAINTEED CORPORATION, Malvern, PA (US)

(72) Inventors: Robert D. Shaw, Parma, MI (US); David J. Stucky, Grass Lake, MI (US); Travis R. Arbogast, East Leroy, MI (US); Randall M. Elinski, Jackson, MI (US); Stephen W. Steffes, McPherson, KS (US)

(73) Assignee: CERTAINTEED CORPORATION, Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/861,689

(22) Filed: Apr. 29, 2020

(65) Prior Publication Data
US 2020/0254664 A1 Aug. 13, 2020

Related U.S. Application Data

(60) Continuation of application No. 15/797,163, filed on Oct. 30, 2017, now Pat. No. 10,668,655, which is a (Continued)

(51) Int. Cl.
*B32B 5/12* (2006.01)
*B29C 45/16* (2006.01)
(Continued)

(52) U.S. Cl.
CPC ........ *B29C 45/1634* (2013.01); *B29C 45/164* (2013.01); *E04D 1/265* (2013.01);
(Continued)

(58) Field of Classification Search
CPC ........ B29C 45/164; E04D 1/265; E04D 1/04; E04D 1/16; B29L 2031/108; Y10T 428/24132
(Continued)

(56) References Cited

U.S. PATENT DOCUMENTS 1,315,260 A 9/1919 Tischler
1,366,175 A 1/1921 Hansen
(Continued)

FOREIGN PATENT DOCUMENTS

AU 545365 B2 7/1985
CA 2593188 A1 1/2008
(Continued)

OTHER PUBLICATIONS

Technical Search, 7 pgs, 2014.
(Continued)

*Primary Examiner* — Chi Q Nguyen
(74) *Attorney, Agent, or Firm* — Abel Schillinger, LLP; Thomas H. Osborn (57) ABSTRACT

An injection molded product is disclosed and includes a shingle resembling a cedar shingle tile formed from an amorphous or semi-crystalline thermoplastic and having a wood grain direction. The injection molded product also includes streaks in the shingle that are substantially parallel to the wood grain direction and the streaks extend through an interior of the shingle and appear as contrasting streaks on an exterior of the shingle to form a variegated wood grain appearance. The injection molded product further includes an injection molded vestige in the shingle. The injection molded vestige is located adjacent to a perimeter of the shingle and the injection molded vestige comprises a location at which material entered an injection mold through a gate.

20 Claims, 3 Drawing Sheets

Related U.S. Application Data division of application No. 14/202,032, filed on Mar. 10, 2014, now Pat. No. 9,802,346.

(60) Provisional application No. 61/794,479, filed on Mar. 15, 2013.

(51) Int. Cl.
  *E04D 1/26* (2006.01)
  *E04D 3/32* (2006.01)
  *B29L 31/10* (2006.01)

(52) U.S. Cl.
  CPC .......... *E04D 3/32* (2013.01); *B29L 2031/104* (2013.01); *B29L 2031/108* (2013.01); *Y10T 428/24132* (2015.01)

(58) Field of Classification Search
  USPC .......... 52/518, 529, 530, 533; 428/151, 141; 264/328.16, 73, 75
  See application file for complete search history.

(56) References Cited

U.S. PATENT DOCUMENTS

| | | | |
|---|---|---|---|
| 1,404,483 A | | 1/1922 | Scharwath et al. |
| 1,414,483 A | | 5/1922 | Novitzky |
| 2,168,218 A | | 8/1939 | Kirschbraun |
| 2,252,539 A | | 8/1941 | Adams |
| 2,485,323 A | | 10/1949 | Schwartz |
| 2,735,143 A | | 2/1956 | Kearns |
| 2,744,360 A | * | 5/1956 | Collini ............... B28B 1/54 65/68 |
| 3,200,547 A | | 8/1965 | Johnson |
| 3,444,657 A | | 5/1969 | Swanson |
| 3,579,940 A | | 5/1971 | Greenleaf |
| 3,593,479 A | | 7/1971 | Hinds et al. |
| 3,676,538 A | | 7/1972 | Patterson |
| 3,720,031 A | | 3/1973 | Wilson et al. |
| 3,774,428 A | | 11/1973 | Derry et al. |
| 3,848,383 A | | 11/1974 | Wilson et al. |
| 3,852,931 A | | 12/1974 | Morse et al. |
| 3,852,934 A | | 12/1974 | Kirkhuff |
| 3,943,677 A | | 3/1976 | Carothers |
| 4,048,101 A | | 9/1977 | Nakamachi |
| 4,128,369 A | | 12/1978 | Kemerer et al. |
| 4,299,792 A | | 11/1981 | Nunn |
| 4,306,848 A | | 12/1981 | Nunn |
| 4,308,702 A | | 1/1982 | Rajewski |
| 4,395,376 A | | 7/1983 | Matthews |
| 4,835,925 A | | 6/1989 | Hoffmann, Sr. |
| 4,972,647 A | | 11/1990 | Meldrum |
| D316,299 S | | 4/1991 | Hurlburt |
| 5,213,861 A | | 5/1993 | Severson et al. |
| 5,232,751 A | | 8/1993 | Cameron et al. |
| 5,295,340 A | | 3/1994 | Collins |
| 5,517,794 A | | 5/1996 | Wagner |
| 5,569,474 A | * | 10/1996 | Kitaichi ............... B29C 33/08 219/541 |
| 5,615,523 A | | 4/1997 | Wells et al. |
| 5,624,115 A | | 4/1997 | Baum |
| 5,711,126 A | | 1/1998 | Wells |
| 5,743,059 A | | 4/1998 | Fifield |
| 5,866,639 A | | 2/1999 | Dorchester et al. |
| 5,868,639 A | | 2/1999 | Dorchester |
| 5,902,683 A | | 5/1999 | Sieloff |
| 5,916,502 A | | 6/1999 | Niwa et al. |
| 5,946,877 A | | 9/1999 | Gallinat et al. |
| 5,956,914 A | | 9/1999 | Williamson |
| 5,974,748 A | | 11/1999 | Sciuga et al. |
| 5,992,116 A | | 11/1999 | Ternes et al. |
| 6,021,611 A | | 2/2000 | Wells et al. |
| 6,046,265 A | | 4/2000 | Clark et al. |
| 6,112,492 A | | 9/2000 | Wells et al. |
| 6,125,602 A | | 10/2000 | Freiborg et al. |
| 6,152,840 A | | 11/2000 | Baum |
| 6,224,701 B1 | | 5/2001 | Bryant et al. |
| 6,261,074 B1 | | 7/2001 | Clark, Jr. |
| 6,291,369 B1 | | 9/2001 | Yoshikawa et al. |
| 6,332,296 B1 | | 12/2001 | Moscovitch |
| 6,345,479 B1 | | 2/2002 | Hutchinson et al. |
| D454,648 S | | 3/2002 | Shaw et al. |
| 6,418,692 B1 | | 7/2002 | Freshwater et al. |
| 6,421,975 B2 | | 7/2002 | Bryant et al. |
| 6,530,189 B2 | | 3/2003 | Freshwater et al. |
| 6,660,196 B1 | | 12/2003 | Iwase et al. |
| 6,684,587 B2 | | 2/2004 | Shaw et al. |
| 6,715,250 B2 | | 4/2004 | Bryant et al. |
| 6,776,600 B1 | | 8/2004 | Zahoransky et al. |
| 6,827,995 B2 | | 12/2004 | Hughes et al. |
| 6,841,221 B2 | * | 1/2005 | MacQueen ............ B05D 5/061 428/141 |
| 6,872,438 B1 | | 3/2005 | Allgeuer et al. |
| 6,883,282 B1 | | 4/2005 | Newhart, III |
| 6,946,182 B1 | | 9/2005 | Allgeuer et al. |
| 7,207,145 B2 | | 4/2007 | Stucky et al. |
| 7,587,864 B2 | | 9/2009 | McCaskill et al. |
| 7,587,871 B2 | | 9/2009 | Perry |
| D618,367 S | | 6/2010 | Schwarz et al. |
| 7,735,286 B2 | | 6/2010 | Trabue et al. |
| 7,735,287 B2 | | 6/2010 | Gaudreau |
| 7,926,227 B2 | | 4/2011 | Mower et al. |
| 7,980,037 B2 | | 7/2011 | Trabue et al. |
| 8,020,353 B2 | | 9/2011 | Gaudreau |
| 8,033,064 B2 | | 10/2011 | Guadreau |
| D648,038 S | | 11/2011 | Gaudreau |
| 8,074,417 B2 | | 12/2011 | Trabue et al. |
| 8,136,316 B2 | | 3/2012 | Schwarz et al. |
| 8,136,322 B2 | | 3/2012 | Shadwell et al. |
| 8,151,530 B2 | | 4/2012 | Schwarz et al. |
| 8,153,045 B2 | | 4/2012 | Boor |
| 8,209,938 B2 | | 7/2012 | Gaudreau et al. |
| 8,261,505 B2 | | 9/2012 | Kalkanoglu et al. |
| 8,371,081 B2 | | 2/2013 | Bennett et al. |
| 8,375,663 B2 | | 2/2013 | Johnston et al. |
| 8,407,962 B2 | | 4/2013 | Cahill et al. |
| 8,420,172 B1 | | 4/2013 | Loper et al. |
| 8,453,410 B2 | | 6/2013 | Kalkanoglu et al. |
| 8,516,765 B2 | | 8/2013 | Shaw et al. |
| 8,572,921 B2 | | 11/2013 | Ward et al. |
| 8,590,270 B2 | | 11/2013 | Martinique |
| 8,601,764 B2 | | 12/2013 | Cahill et al. |
| 8,677,709 B2 | | 3/2014 | DiLonardo et al. |
| 8,850,771 B2 | | 10/2014 | Jenkins et al. |
| 8,950,139 B2 | | 2/2015 | Luetgert et al. |
| 9,452,560 B2 | * | 9/2016 | Kalkanoglu ........... B29C 48/276 |
| 9,802,346 B2 | * | 10/2017 | Shaw ..................... E04D 1/265 |
| 9,884,443 B2 | | 2/2018 | Steffes et al. |
| 9,885,185 B2 | | 2/2018 | Steffes et al. |
| 10,688,655 B2 | * | 6/2020 | Hirose ..................... G05B 1/00 |
| 2001/0037617 A1 | | 11/2001 | Chi |
| 2001/0041256 A1 | | 11/2001 | Heilmayr |
| 2002/0034629 A1 | | 3/2002 | Jones |
| 2002/0121057 A1 | | 9/2002 | Steffes et al. |
| 2002/0160114 A1 | | 10/2002 | Cozzolino |
| 2004/0038002 A1 | * | 2/2004 | Franco ..................... B44F 9/02 428/151 |
| 2004/0074175 A1 | | 4/2004 | Tierney |
| 2004/0216417 A1 | | 11/2004 | Wegman |
| 2005/0072092 A1 | | 4/2005 | Williams |
| 2005/0089672 A1 | | 4/2005 | Kuipers et al. |
| 2005/0126112 A1 | | 6/2005 | MacKinnon et al. |
| 2005/0144869 A1 | | 7/2005 | King |
| 2005/0153103 A1 | | 7/2005 | Meyer et al. |
| 2005/0153122 A1 | | 7/2005 | Detterman |
| 2005/0221034 A1 | | 10/2005 | Iwasaki et al. |
| 2006/0013994 A1 | | 1/2006 | Burke et al. |
| 2006/0026908 A1 | | 2/2006 | Gregori et al. |
| 2006/0130419 A1 | | 6/2006 | Bowman |
| 2006/0272278 A1 | | 12/2006 | McMahan et al. |
| 2007/0045887 A1 | | 3/2007 | Boor |
| 2007/0119107 A1 | | 5/2007 | Shaw et al. |
| 2008/0010924 A1 | | 1/2008 | Pietruczynik et al. |
| 2008/0083186 A1 | | 4/2008 | Guadreau |

(56) References Cited

U.S. PATENT DOCUMENTS

| | | |
|---|---|---|
| 2008/0185748 A1 | 8/2008 | Kalkanoglu |
| 2008/0236064 A1 | 10/2008 | Sippola |
| 2009/0084058 A1 | 4/2009 | Cahill et al. |
| 2009/0293401 A1 | 12/2009 | Lappin et al. |
| 2010/0011690 A1 | 1/2010 | Schwarz et al. |
| 2010/0032861 A1 | 2/2010 | Pietruczynik et al. |
| 2010/0088988 A1 | 4/2010 | Guadreau |
| 2010/0107530 A1 | 5/2010 | Pietruczynik et al. |
| 2010/0112288 A1 | 5/2010 | Shakir et al. |
| 2010/0129622 A1 | 5/2010 | Kalkanoglu et al. |
| 2010/0330272 A1 | 12/2010 | Jeng |
| 2011/0023392 A1 | 2/2011 | Rosenthal et al. |
| 2011/0023396 A1 | 2/2011 | Schwarz et al. |
| 2011/0036040 A1 | 2/2011 | Child |
| 2011/0061323 A1 | 3/2011 | Schwarz et al. |
| 2011/0185665 A1 | 8/2011 | Allen et al. |
| 2011/0265417 A1 | 11/2011 | Trabue et al. |
| 2012/0003426 A1 | 1/2012 | Ying |
| 2012/0031012 A1 | 2/2012 | Bonshor |
| 2012/0085053 A1 | 4/2012 | Barone |
| 2012/0117906 A1 | 5/2012 | Moller, Jr. et al. |
| 2012/0117908 A1 | 5/2012 | Turek et al. |
| 2012/0193826 A1 | 8/2012 | Boor |
| 2012/0285109 A1 | 11/2012 | Mollinger et al. |
| 2012/0324812 A1 | 12/2012 | Robertson |
| 2013/0169004 A1 | 7/2013 | Yamamoto |
| 2014/0170365 A1 | 6/2014 | Gavris et al. |
| 2014/0227478 A1 | 8/2014 | Stucky et al. |
| 2014/0272273 A1 | 9/2014 | Shaw et al. |
| 2015/0167313 A1 | 6/2015 | Steffes et al. |
| 2015/0298374 A1* | 10/2015 | Steffes ............... E04F 19/024 52/287.1 |
| 2016/0023385 A1 | 1/2016 | Nagase et al. |
| 2018/0056559 A1 | 3/2018 | Shaw et al. |
| 2018/0117809 A1 | 5/2018 | Steffes et al. |

FOREIGN PATENT DOCUMENTS

| | | |
|---|---|---|
| CA | 2683214 A1 | 1/2008 |
| CA | 2729386 A1 | 7/2011 |
| CA | 160070 S | 8/2015 |
| CN | 101568421 B | 7/2013 |
| EP | 0046003 A2 | 2/1982 |
| EP | 1504164 B1 | 10/2012 |
| EP | 1937456 B1 | 10/2013 |
| GB | 2050929 A | 1/1981 |
| JP | 2009505872 A | 2/2009 |
| JP | 2009222437 A | 10/2009 |
| JP | 4842322 B2 | 12/2011 |
| KR | 20080064812 A | 7/2008 |
| WO | 9922092 A1 | 5/1999 |
| WO | 03095760 A1 | 11/2003 |
| WO | 2005070670 A1 | 8/2005 |
| WO | 2007027874 A2 | 3/2007 |
| WO | 2012009329 A1 | 1/2012 |
| WO | 2012067699 A1 | 5/2012 |
| ZA | 8105013 A | 8/1982 |

OTHER PUBLICATIONS

CT 17 Clearance search results, 2 pgs, 2013.
Technical Search, 1 pg, 2014.
Technical Search, 4 pgs, Sep. 2012.
Technical Search, 7 pgs, Sep. 2012.

* cited by examiner

VARIEGATED BUILDING PRODUCT AND METHOD

CROSS-REFERENCE TO RELATED APPLICATION(S)

This application is a continuation of and claims priority to the prior filed and U.S. patent application Ser. No. 15/797,163, filed on Oct. 30, 2017, by Robert D. SHAW et al., entitled "VARIEGATED BUILDING PRODUCT AND METHOD," which is a divisional of and claims priority to U.S. patent application Ser. No. 14/202,032, filed on Mar. 10, 2014, by Robert D. SHAW et al., entitled "VARIEGATED BUILDING PRODUCT AND METHOD," now U.S. Pat. No. 9,802,346, which claims priority to and the benefit of U.S. Provisional Patent Application No. 61/794,479, filed on Mar. 15, 2013, by Robert D. SHAW et al., entitled "VARIEGATED BUILDING PRODUCT AND METHOD," the disclosures of which are assigned to the current assignee hereof and incorporated herein by reference in their entireties for all purposes.

BACKGROUND OF THE INVENTION

Field of the Disclosure

The present invention relates in general to building products and, in particular, to an improved system, method and apparatus for variegated building products.

Description of the Related Art

Building products such as vinyl siding panels and roofing tiles are widely used for protecting the exterior walls and roofs of buildings, respectively, as well as for enhancing the exterior appearance of buildings. These building products may have different profiles and exterior finishes to provide variety in the exterior appearance of a building. Typically, the siding panels and roofing tiles are nailed or otherwise secured to the building to fix them in place.

Formerly, in constructing vinyl siding panels, it was customary to extrude a sheet of vinyl with the entire profile formed therein, and to then cut the sheet of vinyl into panels of appropriate lengths. The sheet utilized conventional color concentrators designed to give it a desired coloration properties. The sheets could also be embossed or otherwise formed to add ornamentation to more closely simulate natural wood building products.

Some siding is post-formed vinyl siding, in which the siding is extruded as a flat sheet and then formed into the desired shape in post forming operations. Rather than forming solid vinyl siding panels, other siding products are co-extruded panels having a base substrate and an outer layer. The outer layer is commonly called a capstock. The substrate layer is hidden from view when the siding is applied to a building, and is typically formed of conventional, relatively inexpensive but sturdy polyvinyl chloride (PVC). The substrate typically utilizes conventional color concentrators designed to give it a desired coloration properties. The outer layer forms the exposed or outer component of the vinyl product.

Existing products are limited to extruded siding or plank products. There is a need for variegated products that are produced by injection molding. Current methods for producing multi-color woodgrain appearance include applied films and coatings. However these products are challenged by long term durability performance issues such as color-hold, adhesion and abrasion.

Other options include extruded capstock that may be formed of the same composition as the substrate and may include a color material that forms accent color streaks. These methods can produce variegated siding panels having a natural, wood grain-like appearance. It would be desirable to produce a variegated building product using injection molding equipment.

SUMMARY

Embodiments of a system, method and apparatus for variegated building products are disclosed. For example, a method of molding a building product may comprise providing an injection mold with a plurality of gates located adjacent a perimeter of the injection mold. The method may further comprise commingling a first material and a second material into a flow. The second material may comprise a color that contrasts with a color of the first material.

Embodiments of the method may include injecting the commingled flow into the plurality of gates to form an injection molded building product, and removing the molded building product from the injection mold. In addition, the second material may extend through an interior of the molded building product and appear as contrasting streaks on an exterior of the building product to form a variegated grain appearance.

Other embodiments of a method of molding a building product may comprise providing an injection mold with a first gate and a second gate, wherein each of the first and second gates is located adjacent a perimeter of the injection mold. The method may include injecting a first material into the first gate, and injecting a second material into the second gate at about a same time as the first material. The first and second materials may be substantially simultaneously co-injected into the injection mold. The second material may comprise a color that contrasts with a color of the first material. The second material may extend through an interior of the molded building product and appear as contrasting streaks on an exterior of the building product to form a variegated grain appearance.

Embodiments of an injection molded product may comprise a shingle resembling a cedar shingle tile formed from an amorphous or semi-crystalline thermoplastic and having a wood grain direction. Streaks in the shingle may be substantially parallel to the wood grain direction. The streaks may extend through an interior of the shingle and appear as contrasting streaks on an exterior of the shingle to form a variegated wood grain appearance. In addition, there may be injection molded vestiges in the shingle. All of the injection molded vestiges may be located adjacent a perimeter of the shingle. The injection molded vestiges may comprise the locations at which material entered an injection mold through edge gates.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Embodiments of a system, method and apparatus for variegated building products are disclosed. Examples of the building product may include a shingle, such as a cedar shingle or shake tile and having a wood grain direction (e.g., vertical in FIGS. 1 and 2). Alternatively, the building product 11 can be a roofing tile (or still other building products) having a grain direction. For example, the building product 11 may simulate other materials such as simulated slate with a general grain direction.

In some embodiments, the method may comprise and the building product may be formed from a one or two-shot process. Embodiments of molding a building product 11 (FIGS. 1-5) may comprise providing an injection mold 13 (shown schematically) with a plurality of gates 15 located adjacent a perimeter 17 of the injection mold 13. Adjacent the perimeter 17 may include at or on the perimeter 17. The materials used to form the building product may be commingled prior to entering the mold, or they may enter the mold separately or independently, such that they do not commingle until they are inside the mold.

Figure 1:
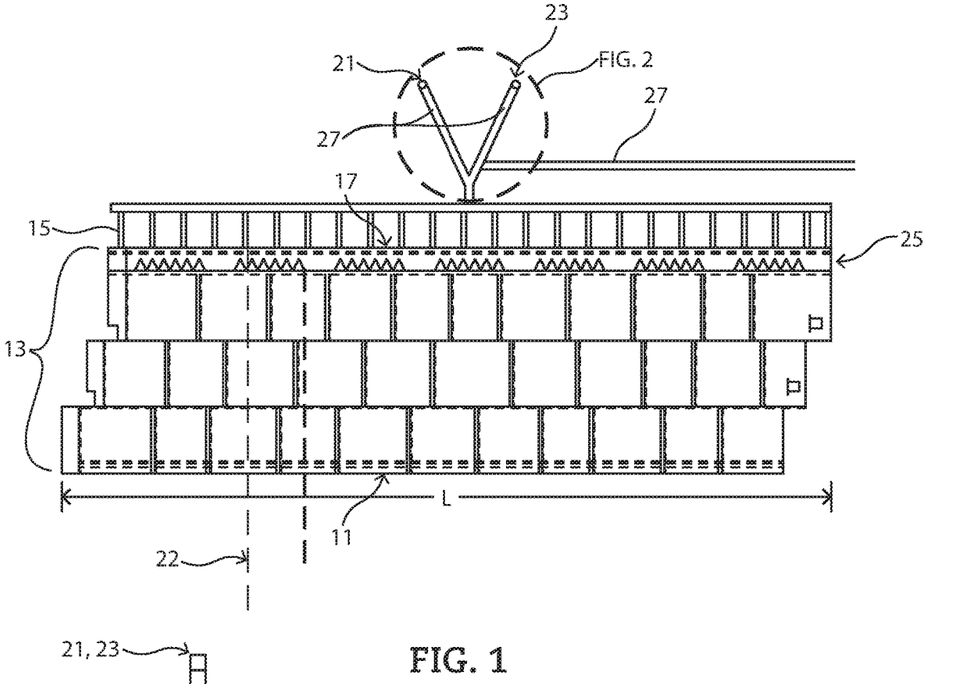
FIG. 1 is a schematic front view of an apparatus for producing an embodiment of an injection molded product.
Figure 2:
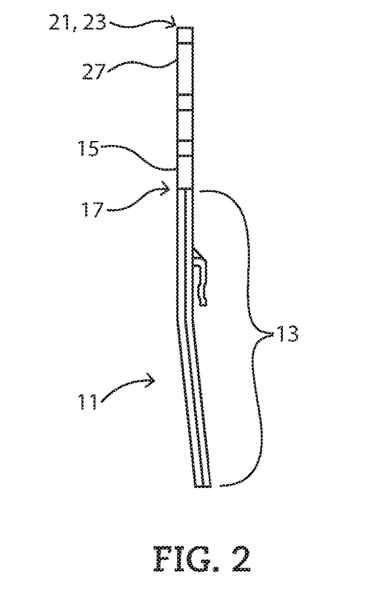
FIG. 2 is an enlarged schematic end view of a portion of an embodiment of an injection molding apparatus and process.

As portrayed in FIGS. 1 and 2, the method also may include commingling a first material 21 and a second material 23 into one or more runners 27 prior to entering the mold 13. The second material 23 may comprise a color that contrasts with a color of the first material 21.

Embodiments of commingling may comprise intentionally not mixing the first and second materials 21, 23, such that any mixing that does take place is incidental and unintended. The method may include injecting the commingled flow into the plurality of gates 15 to form an injection molded building product 11. The molded building product 11 may then be removed from the injection mold 13.

Figure 3:
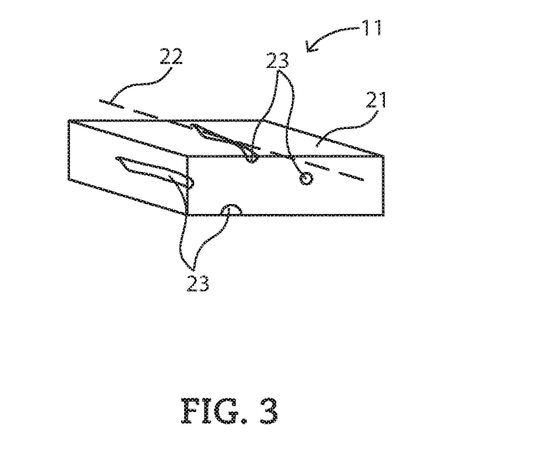
FIG. 3 is a schematic view of an embodiment of building product.
Figure 4:
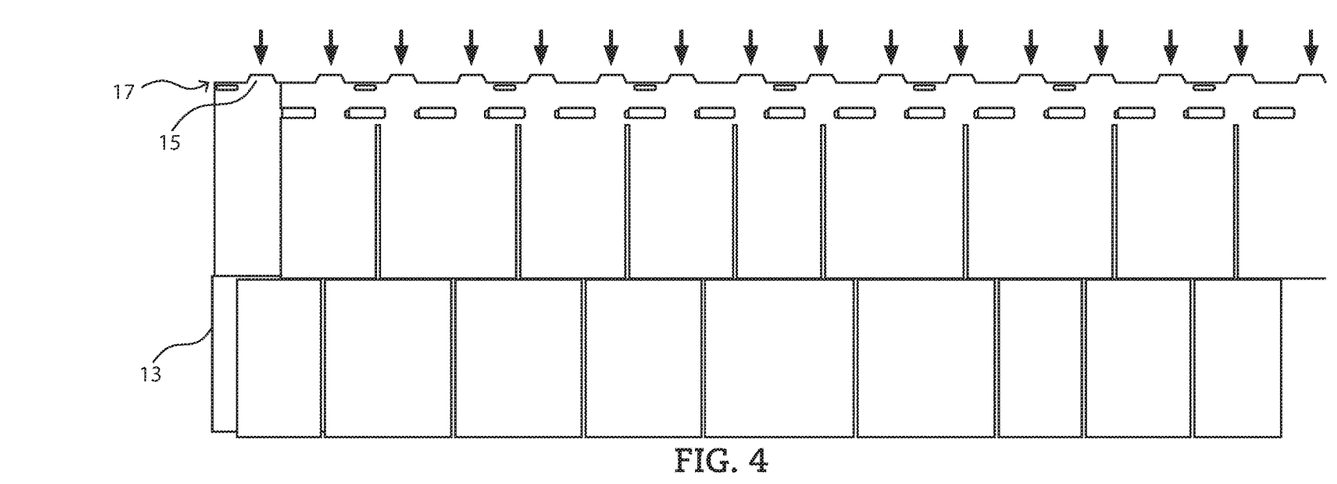
FIGS. 4 and 5 are schematic front views of an embodiment of a mold before and after, respectively, material is injected.
Figure 5:
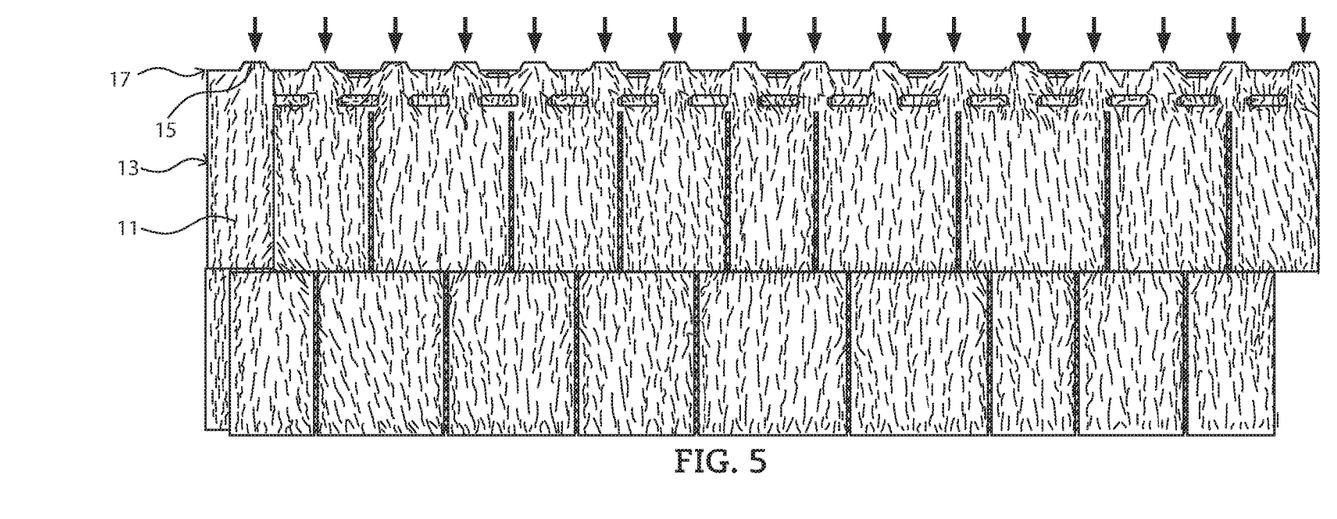

As shown in FIG. 3, the second material 23 may extend through an interior of the molded building product 11 and appear as contrasting streaks on an exterior of the building product 11 to form a variegated wood grain appearance. The contrasting streaks in the shake, roofing tile or other building product can be substantially parallel to the intended wood grain direction 22.

In some embodiments, both the first and second materials 21, 23 may be an amorphous or semi-crystalline thermoplastic, or a thermoset material. The first material 21 may be a solid at room temperature, and the second material 23 may be a liquid at room temperature, or both materials may be solid at room temperature. The first material 21 may have a melting point that is less than a melting point of the second material 23. For example, the melting point of the first material 21 may be about 20° F. to about 70° F. less than the melting point of the second material 23.

Embodiments of the first material may comprise a selected amount of a base resin, or a compounded material comprising a mixture of two or more materials. For example, the first material may comprise about 85 wt % to about 97 wt % of a base resin. The first material 21 may comprise a base resin, and the second material 23 may comprise a colorant that has a melting point similar to that of the base resin. The term 'colorant' may be defined as a pure pigment, a concentrate or a diluted compound.

Alternatively, the first material 21 may comprise a base resin, and may further comprise a third material comprising a high melt streaker of a same polymer group as that of the base resin. The third material may melt at a higher temperature than that of the base resin. The method and building product may further comprise a blend of the high melt streaker and a fourth material. The fourth material may comprise a standard melt streaker of a same polymer group as that of the base resin. The fourth material may melt at a temperature between those of the base resin and the high melt streaker. These materials may comprise different polymer groups as well.

In still other embodiments, the method and building product may have a commingled flow that comprises about 0.1% to about 5% colorant, such as about 1%. Embodiments of the commingled flow may comprise about 0.1% to about 5% of the high melt streaker, such as about 1%. In addition, the commingled flow may comprise about 0.5% to about 5% of the blend, such as about 2%, or up to about 10%, up to about 20%, or even up to about 30%. Examples of the blend may include a ratio of about 30/70 to about 70/30 (e.g., 50/50) of the high melt streaker and the standard melt streaker, respectively. Examples of the base resin may include polypropylene. The melting point of the high melt streaker can be at least about 30° F. higher than that of the base resin. The melting point of the standard melt streaker can be at least about 20° F. higher than that of the base resin.

In some examples, the gates 15 may be spaced apart from each by no more than about 100 mm. For example, the gate spacing may be no more than about 90 mm, such as no more than about 80 mm. The gates 15 may be located on a single side of the perimeter 17 of the injection mold 13, as shown in FIG. 1. In other versions, the gates 15 may be located on opposing sides of the perimeter 17 of the injection mold 13.

The injection mold 13 may comprise a cavity located within the perimeter 17. Embodiments of the cavity may generally be in a shape of a flat panel. The flat panel may have a largest dimension L (FIG. 1). Each of the gates 15 may be located within about one-fourth of the largest dimension L from the perimeter 17 of the injection mold 13. The method may comprise having substantially linear commingled flow through the flat panel of the cavity away from the gates 15.

In some examples, the gates 15 may be located in a hanger portion 25 of the mold 13. Any vestiges (e.g., remnants or evidence) of the injection molding process can be removed. In some embodiments, at least one of the gates 15 is an edge gate. For example, in FIGS. 1 and 2, two edge gates with runners 27 are shown.

The method may further comprise forming injection molded vestiges in the molded building product 11. In some versions, all of the injection molded vestiges may be located adjacent the perimeter 17. The injection molded vestiges may comprise the locations at which the commingled flow entered the injection mold 13 through the gates 15. The method may further comprise trimming the molded building product 11 after it is removed from the mold, such that the trimmed molded building product has no projecting injection molded vestiges.

Other embodiments of method may comprise a two-shot process. For example, the method of molding a building product may comprise providing an injection mold 33 (FIG. 6) with at least one first gate 35 and at least one second gate 37 (e.g., two are shown). Each of the first and second gates 35, 37 may be located adjacent a perimeter 17 of the injection mold 33.

Figure 6:
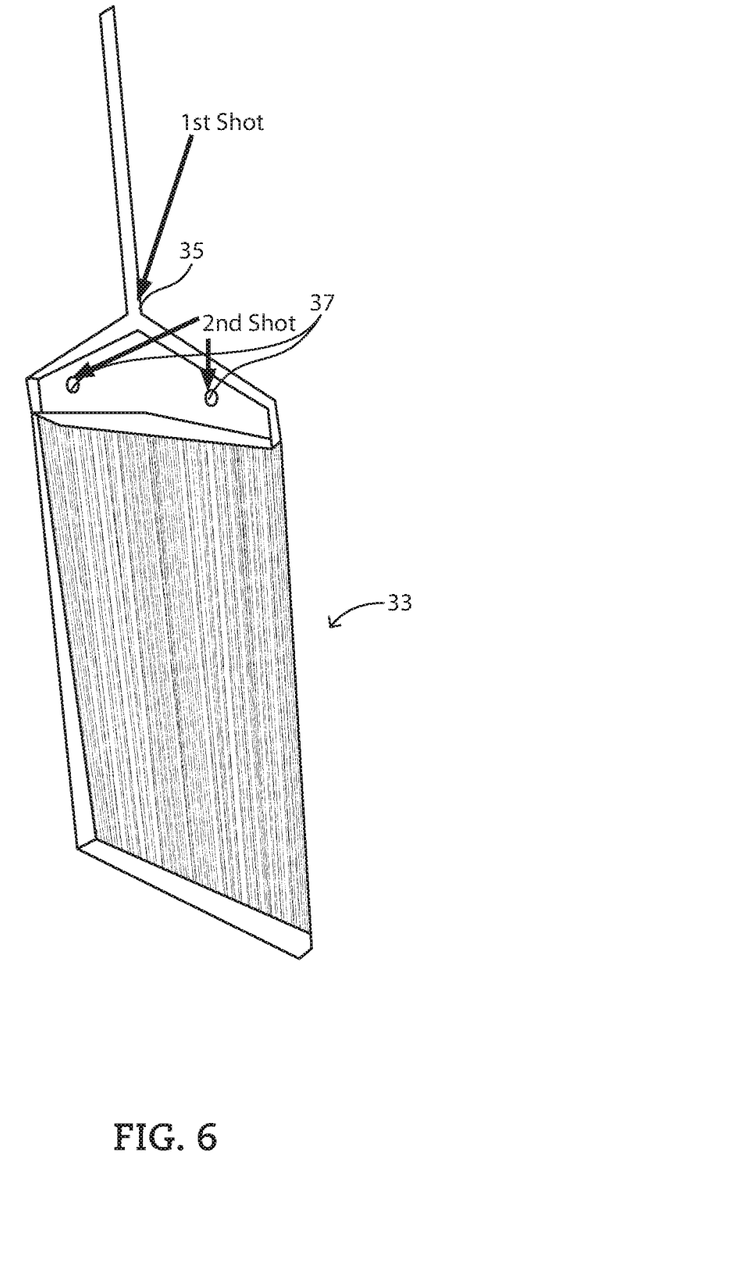
FIG. 6 is an isometric view of another embodiment of an injection mold.

The method may include injecting a first material into the first gate 35, and injecting a second material into the second gate 37 at about a same time as the first material. The first and second materials may be substantially simultaneously co-injected into the injection mold 33. The second material may comprise a color that contrasts with a color of the first material. The molded building product may then be removed from the injection mold 33. The second material may extend through an interior of the molded building product and appear as contrasting streaks on an exterior of the building product to form a variegated wood grain appearance. The materials, properties, colors, dimensions and other aspects and qualities of the components may be provided as described elsewhere herein for the other embodiments.

As described herein, embodiments of a building product may be produced by a one-shot method, a two-shot method, or multiple shot methods. The injection molded product may comprise a shake resembling a cedar shake tile formed from an amorphous or semi-crystalline thermoplastic and having a wood grain direction. Streaks may be provided in the shake that are substantially parallel to the wood grain direction. The streaks may extend through an interior of the shake and appear as contrasting streaks on an exterior of the shake to form a variegated wood grain appearance.

Embodiments may include injection molded vestiges in the shake. For example, all of the injection molded vestiges may be located adjacent a perimeter of the shake. The injection molded vestiges may comprise the locations at which material entered an injection mold through gates. The shake may be trimmed such that the trimmed shake has no projecting injection molded vestiges. The shake may comprise a single cedar shake tile (e.g., like FIG. 3). The shake also may comprise a plurality of tiles (e.g., FIG. 1) that appear to be separated, but are not actually separated, from each other by tile separations along at least one side edge or at least one end edge thereof. For example, at least two of the plurality of tiles may appear to be at least partially overlapping, but are not actually overlapping, each other, as shown.

As described herein, a plurality of colors may be used to form the building product, such as with resin pellets. The term "resin" is not particularly limited and may include a polymer, plastic, and the like, which may be thermoplastic or thermosetting. The term "pellets" is used herein in a broad sense to include any type of pellets, granules, regrind, powder, particles, grains, spheres, plates, etc., that can be used in the method. The pellets are not particularly limited and may have any shape and size including any elongation (length/width), convexity (surface roughness), and circularity (perimeter). For example, the pellets can be between about 3/32-inch and about 1/8-inch in diameter and can be square, rectangular, spherical, etc. It is contemplated that one or more of these pellet sizes may vary from the values and/or range of values above by selected percentages.

Embodiments of the resin pellets used to form the building product may include base color pellets including a base polymer and having a base color, first color pellets including a first polymer and having a first color, and second color pellets including a second polymer and having a second color. The base polymer, the first polymer, and the second polymer may be the same or may be different. The base color pellets, the first color pellets, and the second color pellets, independently may include one or more of the base polymer, the first polymer, the second polymer, and combinations thereof.

The polymers can each independently be, for example, a polyalkylene polymer, such as polypropylene or polyethylene. Non-limiting examples of suitable polyethylene include ultra high molecular weight polyethylene (UHMWPE), ultra low molecular weight polyethylene (ULMWPE), high molecular weight polyethylene (HMWPE), high density polyethylene (HDPE), high density cross-linked polyethylene (HDXLPE), cross-linked polyethylene (PEX or XLPE), medium density polyethylene (MDPE), linear low density polyethylene (LLDPE), low density polyethylene (LDPE), very low density polyethylene (VLDPE), and combinations thereof. Moreover, the polymers may each independently include other polymers or mixtures thereof, such as acrylics, silicones, polyurethanes, halogenated plastics, polyester, polyethylene terephthalate, polyvinyl chloride (PVC), polystyrene, polyamides, polycarbonate, phenolics, polyetheretherketone, polyetherimide, polylactic acid, polymethylmethacrylate, polytetrafluoroethylene, and combinations thereof.

One or more of the polymers can be opaque, translucent, or transparent before having the base color, first color, and second color, respectively. In addition, these polymers are not particularly limited in physical properties such as tensile strength, hardness, elongation, density, glass transition temperature, and the like. One or more of the polymers can be filled (e.g. mineral filled) or unfilled. Non-limiting examples of suitable fillers include magnesium, phosphorus, calcium, and combinations thereof. In addition, one or more of the base polymer, the first polymer, and the second polymer can include one or more additives including, but not limited to, oxidative and thermal stabilizers, impact modifiers, lubricants, release agents, flame-retarding agents, oxidation inhibitors, oxidation scavengers, neutralizers, antiblock agents, dyes, pigments and other coloring agents, ultraviolet light absorbers and stabilizers, organic or inorganic fillers, reinforcing agents, nucleators, plasticizers, waxes, and combinations thereof. Most typically, at least one of the base polymer, the first polymer, and the second polymer is fire resistant, e.g., includes a flame-retarding agent.

The colors may be generated, or formed from/using, any dye or pigment or other colorant known in the art. The colors are different. Typically, the first colorant and the second colorant may be relatively dark and relatively light compared to each other. However, in the alternative to being different shades of the same color, the first colorant and the second colorant can have different colors. For example, the base color, the first color, and the second color may be such that the color variations are various shades of grey with varying grey streaks to simulate wood shake.

Alternatively, the base color, the first color, and the second color may create any type of color variation by embodiments of the method to achieve a color variation simulating a natural building material such as wood, stone, brick, marble, ceramic, clay, slate, brick, metal, concrete, etc. The building product can be generally categorized into one of various color variations; however, each building product may have a slightly different appearance. In other words, even though each building product can be categorized, each building product may have a unique appearance caused by streaks that are randomly oriented on the building product and can have varying shades of colors.

In still other embodiments, one or more of the following items may be included.

Item 1. A method of injection molding a building product, comprising: (a) providing an injection mold with a plurality of gates located adjacent a perimeter of the injection mold; (b) commingling a first material and a second material into a flow, the second material comprising a color that contrasts with a color of the first material; (c) injecting the commingled flow into the plurality of gates to form an injection molded building product; (d) removing the molded building product from the injection mold; and the second material extends through an interior of the molded building product and appears as contrasting streaks on an exterior of the building product to form a variegated grain appearance.

Item 2. The method of item 1, wherein both the first and second materials are an amorphous or semi-crystalline thermoplastic, or a thermoset material.

Item 3. The method of item 1, wherein the first material is a solid at room temperature and the second material is a liquid at room temperature, or both materials are solid at room temperature.

Item 4. The method of item 1, wherein the first material has a melting point that is less than a melting point of the second material.

Item 5. The method of item 1, wherein the melting point of the first material is about 20° F. to about 70° F. less than the melting point of the second material.

Item 6. The method of item 1, wherein the first material comprises a base resin or a compounded material.

Item 7. The method of item 1, wherein the first material comprises a base resin, and the second material comprises a colorant that has a melting point similar to that of the base resin.

Item 8. The method of item 1, wherein the first material comprises a base resin, and further comprising a third material comprising a high melt streaker of a same or different polymer group as that of the base resin, and the third material melts at a higher temperature than that of the base resin.

Item 9. The method of item 8, further comprising a blend of the high melt streaker and a fourth material, the fourth material comprising a standard melt streaker of a same polymer group as that of the base resin, and the fourth material melts at a temperature between those of the base resin and the high melt streaker.

Item 10. The method of item 7, wherein the commingled flow comprises about 0.1% to about 5% colorant, up to about 10% colorant, up to about 20% colorant, or up to about 30% colorant.

Item 11. The method of item 8, wherein the commingled flow comprises about 0.1% to about 5% of the high melt streaker.

Item 12. The method of item 9, wherein the commingled flow comprises about 0.5% to about 5% of the blend.

Item 13. The method of item 9, wherein the blend is in a ratio of about 30/70 to about 70/30 of the high melt streaker and the standard melt streaker, respectively.

Item 14. The method of item 9, wherein the base resin is polypropylene, the melting point of the high melt streaker is at least about 30° F. higher than that of the base resin, and the melting point of the standard melt streaker is at least about 20° F. higher than that of the base resin.

Item 15. The method of item 1, wherein the building product is a shingle resembling a cedar shingle tile and having a wood grain direction, or a roofing tile having the wood grain direction, and the contrasting streaks in the shake are substantially parallel to the wood grain direction.

Item 16. The method of item 1, wherein the gates are spaced apart from each other by no more than about 100 mm, no more than about 90 mm, or no more than about 80 mm.

Item 17. The method of item 1, wherein the gates are located on a single side of the perimeter of the injection mold, or wherein the gates are located on opposing sides of the perimeter of the injection mold.

Item 18. The method of item 1, wherein the injection mold comprises a cavity located within the perimeter, the cavity is generally in a shape of a flat panel, the flat panel has a largest dimension, and each of the gates is located within about one-fourth of the largest dimension from the perimeter of the injection mold.

Item 19. The method of item 1, wherein at least one of the gates is an edge gate.

Item 20. The method of item 18, wherein step (c) comprises substantially linear commingled flow through the flat panel of the cavity away from the gates.

Item 21. The method of item 1, further comprising forming injection molded vestiges in the molded building product, all of the injection molded vestiges are located adjacent the perimeter, and the injection molded vestiges comprise the locations at which the commingled flow entered the injection mold through the gates.

Item 22. The method of item 21, further comprising the step of trimming the molded building product after step (d) such that the trimmed molded building product has no projecting injection molded vestiges.

Item 23. A method of injection molding a building product, comprising: (a) providing an injection mold with a first gate and a second gate, wherein each of the first and second gates is located adjacent a perimeter of the injection mold; (b) injecting a first material into the first gate; (c) injecting a second material into the second gate at about a same time as step (b), such that the first and second materials are substantially simultaneously co-injected into the injection mold, and the second material comprises a color that contrasts with a color of the first material; (d) removing the molded building product from the injection mold; and the second material extends through an interior of the molded building product and appears as contrasting streaks on an exterior of the building product to form a variegated grain appearance.

Item 24. The method of item 23, wherein both the first and second materials are an amorphous or semi-crystalline thermoplastic.

Item 25. The method of item 23, wherein the first material is a solid at room temperature and the second material is a liquid at room temperature.

Item 26. The method of item 23, wherein the first material has a melting point that is less than a melting point of the second material.

Item 27. The method of item 23, wherein a melting point of the first material is about 20° F. to about 70° F. less than a melting point of the second material.

Item 28. The method of item 23, wherein the first material comprises about 85 wt % to about 97 wt % of a base resin.

Item 29. The method of item 23, wherein the first material comprises a base resin, and the second material comprises a colorant that has a melting point similar to that of the base resin.

Item 30. The method of item 23, wherein the first material comprises a base resin, and further comprising a third material comprising a high melt streaker of a same polymer group as that of the base resin, and the third material melts at a higher temperature than that of the base resin.

Item 31. The method of item 30, further comprising a blend of the high melt streaker and a fourth material, the fourth material comprising a standard melt streaker of a same polymer group as that of the base resin, and the fourth material melts at a temperature between those of the base resin and the high melt streaker.

Item 32. The method of item 29, wherein the commingled flow comprises about 0.1% to about 5% colorant.

Item 33. The method of item 30, wherein the commingled flow comprises about 0.1% to about 5% of the high melt streaker.

Item 34. The method of item 31, wherein the commingled flow comprises about 0.5% to about 5% of the blend.

Item 35. The method of item 31, wherein the blend is in a ratio of about 30/70 to about 50/50 of the high melt streaker and the standard melt streaker, respectively.

Item 36. The method of item 31, wherein the base resin is polypropylene, the melting point of the high melt streaker is at least about 30° F. higher than that of the base resin, and the melting point of the standard melt streaker is at least about 20° F. higher than that of the base resin.

Item 37. The method of item 23, wherein the building product is a shake resembling a cedar shake tile and having a wood grain direction, or a roofing tile having the wood grain direction, and the contrasting streaks in the shake are substantially parallel to the wood grain direction.

Item 38. The method of item 23, wherein the gates are spaced apart from each by no more than about 100 mm, no more than about 90 mm, or no more than about 80 mm.

Item 39. The method of item 23, wherein the gates are located on a single side of the perimeter of the injection mold.

Item 40. The method of item 23, wherein the injection mold comprises a cavity located within the perimeter, the cavity is generally in a shape of a flat panel, the flat panel has a largest dimension, and each of the gates is located within about one-fourth of the largest dimension from the perimeter of the injection mold.

Item 41. The method of item 23, wherein at least one of the gates is an edge gate.

Item 42. The method of item 40, wherein step (c) comprises substantially linear commingled flow through the flat panel of the cavity away from the gates.

Item 43. The method of item 23, further comprising forming injection molded vestiges in the molded building product, all of the injection molded vestiges are located adjacent the perimeter, and the injection molded vestiges comprise the locations at which the commingled flow entered the injection mold through the gates.

Item 44. The method of item 43, further comprising the step of trimming the molded building product after step (d) such that the trimmed molded building product has no projecting injection molded vestiges.

Item 45. An injection molded product, comprising: a shingle resembling a cedar shingle tile formed from an amorphous or semi-crystalline thermoplastic and having a wood grain direction; streaks in the shingle that are substantially parallel to the wood grain direction; the streaks extend through an interior of the shingle and appear as contrasting streaks on an exterior of the shingle to form a variegated wood grain appearance; and an injection molded vestige in the shingle, the injection molded vestige is located adjacent a perimeter of the shingle, and the injection molded vestige comprises the location at which material entered an injection mold through a gate.

Item 46. The injection molded product of item 45, wherein the shingle is trimmed such that the trimmed shingle has no projecting injection molded vestiges.

Item 47. The injection molded product of item 45, wherein the shingle comprises a single cedar shingle tile.

Item 48. The injection molded product of item 45, wherein the shingle comprises a plurality of tiles that appear to be separated from each other but are not separated from each other by tile separations along at least one side edge or at least one end edge thereof.

Item 49. The injection molded product of item 48, wherein at least two of the plurality of tiles appear to be at least partially overlapping each other.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A building product, comprising:
   a first material;
   a second material that forms streaks throughout the first material; and
   an injection molded vestige at which a commingled flow of the first material and the second material entered an injection mold to form the building product.

2. The building product of claim 1, wherein the first material comprises a base resin, and wherein the second material comprises a colorant.

3. The building product of claim 2, wherein the melting point of the colorant is at least 20° F. higher than the melting point of the base resin.

4. The building product of claim 1, wherein the second material forms a plurality of streaks in the building product that are substantially parallel to a wood grain direction of the building product.

5. The building product of claim 4, wherein the plurality of streaks extend through an interior of the building product.

6. The building product of claim 5, wherein the plurality of streaks appear as contrasting streaks on an exterior of the building product to form a variegated wood grain appearance.

7. The building product of claim 1, wherein the first material comprises a base resin and a high melt streaker.

8. The building product of claim 1, wherein the melting point of the high melt streaker is at least 30° F. higher than the melting point of the base resin.

9. The building product of claim 1, wherein the commingled material entered the injection molded vestige through a gate to form the building product.

10. The building product of claim 1, wherein the building product is trimmed such that the trimmed injection molded vestige is not visible in the building product.

11. The building product of claim 1, wherein the building product comprises a plurality of injection molded vestiges on a single side of the perimeter of the building product.

12. A building product, comprising:
    a wood grain direction;
    a plurality of streaks that extend substantially parallel to the wood grain direction and through an interior of the building product; and
    an injection molded vestige at which a commingled flow of the first material and the second material entered an injection mold to form the building product.

13. The building product of claim 12, wherein the first material comprises a base resin, and wherein the second material comprises a colorant having a melting point higher than the base resin.

14. The building product of claim 13, wherein the colorant forms the plurality of streaks, and wherein the plurality of streaks extends through an interior of the building product.

15. The building product of claim 14, wherein the plurality of streaks appear as contrasting streaks on an exterior of the building product to form a variegated wood grain appearance.

16. The building product of claim 12, wherein the commingled material entered the injection molded vestige through at least one gate to form the building product.

17. The building product of claim 12, wherein the building product is trimmed such that the trimmed injection molded vestige is not visible in the building product.

18. The building product of claim 12, wherein the building product comprises a plurality of injection molded vestiges on a single side of the perimeter of the building product.

19. The building product of claim 18, wherein the injection molded vestiges are spaced apart by no more than 100 millimeters.

20. The building product of claim 12, wherein the building product comprises a shingle, a shake tile, or a roofing tile.

* * * * *

UNITED STATES PATENT AND TRADEMARK OFFICE
CERTIFICATE OF CORRECTION

| | |
|---|---|
| PATENT NO. | : 10,882,232 B2 |
| APPLICATION NO. | : 16/861689 |
| DATED | : January 5, 2021 |
| INVENTOR(S) | : Robert D. Shaw et al. |

It is certified that error appears in the above-identified patent and that said Letters Patent is hereby corrected as shown below:

On the Title Page

Item (73), please delete "CERTAINTEED CORPORATION" and insert --CERTAINTEED LLC--

Signed and Sealed this
Fourteenth Day of February, 2023

Katherine Kelly Vidal
*Director of the United States Patent and Trademark Office*